United States Patent [19]

Hieatt et al.

[11] Patent Number: 5,322,635
[45] Date of Patent: Jun. 21, 1994

[54] SOAP COMPOSITIONS OF CARBOXYLIC ACIDS AND AMINES USEFUL IN REMOVAL AND PREVENTION OF SCALE

[75] Inventors: Allen C. Hieatt, Meso; Jerome H. Ludwig, Paradise Valley, both of Ariz.

[73] Assignee: h.e.r.c. Incorporated, Phoenix, Ariz.

[21] Appl. No.: 700,780

[22] Filed: May 16, 1991

[51] Int. Cl.$^5$ .............................................. C02F 5/10
[52] U.S. Cl. ........................................ 252/82; 252/180; 252/142; 134/2; 134/3; 210/698
[58] Field of Search ................. 252/180, 82, 142, 546, 252/544, DIG. 11, 117; 134/2, 3; 210/698

[56] References Cited

U.S. PATENT DOCUMENTS

| | | | |
|---|---|---|---|
| 2,264,103 | 11/1941 | Tucker | 210/698 |
| 3,095,379 | 6/1963 | Schwartz | 252/142 |
| 3,248,269 | 4/1966 | Bell | 134/2 |
| 3,447,965 | 6/1969 | Teumac et al. | 134/2 |
| 3,490,741 | 1/1970 | Teumac et al. | 252/82 |
| 3,639,279 | 2/1972 | Gardner et al. | 252/86 |
| 3,671,448 | 6/1972 | Kowalski | 252/18 |
| 3,907,699 | 9/1975 | Blair | 252/180 |
| 4,032,460 | 6/1977 | Zilch et al. | 252/180 |
| 4,174,290 | 11/1979 | Leveskis | 252/142 |
| 4,207,215 | 6/1980 | Bolan | 252/546 |
| 4,250,048 | 2/1981 | Leveskis | 134/3 |
| 4,435,303 | 3/1984 | Abadi | 252/80 |
| 4,595,517 | 6/1986 | Abadi | 252/82 |
| 4,686,067 | 8/1987 | Beysset et al. | 252/626 |
| 4,797,220 | 1/1989 | Miller | 252/82 |
| 4,802,990 | 2/1989 | Inskeep, Jr. | 210/699 |

OTHER PUBLICATIONS

Hawley's Condensed Chemical Dictionary, 11th Ed. Van Nostrand Reinhold, N.Y. 1987, p. 1232.

Primary Examiner—Prince Willis, Jr.
Assistant Examiner—J. Silbermann
Attorney, Agent, or Firm—Wood, Herron & Evans

[57] ABSTRACT

A soap composition for the removal and prevention of scale in aqueous media comprising a 1:1 stoichiometric equivalent of an organic carboxylic acid and an amine base. The organic carboxylic acid is selected from the group consisting of hydroxyacetic, citric, acetic, gluconic, salicylic, tartaric and benzoic, and mixtures thereof. The amine base is selected from the group consisting of monoisopropanolamine, diisopropanolamine, triisopropanolamine, monoethanolamine, diethanolamine, triethanolamine, diethylamine and mixtures thereof.

9 Claims, No Drawings

SOAP COMPOSITIONS OF CARBOXYLIC ACIDS AND AMINES USEFUL IN REMOVAL AND PREVENTION OF SCALE

BACKGROUND OF THE INVENTION

Compositions for removal and prevention of scale are well developed in the patent art. "Scale" is a term that applies to deposits on surfaces such as bath tubs, shower tiles, cooling towers, heat exchangers, evaporative coolers, swimming pools, fountains, hydraspas, water purification systems, and the like. Scale deposits usually include compounds such as metal carbonates, oxides and hydroxides which deposit on surfaces in contact with water generally as a result of exceeding the limit of solubility of such materials in water. A considerable number of patents have issued covering compositions for the removal or prevention of scale including U.S. Pats. Nos. 3,447,965; 3,490,741; 3,639,279; 3,671,448; 4,435,303; 4,595,517; 4,686,067; 4,797,220 and 4,802,990. These patents are not the only patents related to the subject matter of this invention and they are not represented to be the most pertinent prior art. They are merely illustrative of various descaling and scale prevention compositions that have been disclosed in prior patents.

Many formulations disclosed in the above mentioned patents are acidic or alkaline in nature and have many disadvantages, such as irritation to the skin, eyes and mucous membranes during use. Additionally, prior formulations tend to react with the surfaces with which they come into contact during use including metal, ceramic and grout surfaces. Other known compositions tend to rapidly generate carbon dioxide gas as a result of their reaction with metal carbonate during use. Another disadvantage of current compositions is their potential reactivity with chlorine-containing materials with which they may be used to generate chlorine gas during use or storage.

In particular, for example, U.S. Pat. No. 4,797,220 discloses an aqueous composition of hydroxyacetic acid and triethanolamine at volume percentages of 0.7 to 10 of the acid to the amine with a 2 to 3.5 ratio being preferred. These compositions are highly acidic with pHs on the order of about 2-3 and can attack various metal surfaces, dissolve tile grout, react with chlorine-containing cleaners and irritate mucous membranes. While other alkaline compositions have been suggested, they suffer from similar disadvantages and are generally less effective.

In brief, there has been a continuing need for effective chemical compositions and processes for removal and prevention of scale. There is a need for compositions that would minimize or eliminate the disadvantages associated with known compositions.

SUMMARY OF THE INVENTION

This invention is directed to aqueous compositions having long term descaling activity. In accordance with this invention, a composition for the removal and prevention of scale in aqueous media comprises stoichiometric equivalents of an organic carboxylic acid and an amine base. These soap compositions of carboxylic acids and an amine base at a 1:1 stoichiometric ratio have effective and long term activity in removing scale and preventing scale precipitation. These soap compositions minimize or eliminate the disadvantages mentioned in the background of this invention.

The 1:1 stoichiometric soap compositions include an organic carboxylic acid such as hydroxyacetic, citric, acetic, gluconic, salicylic, tartaric, benzoic and others. The amine base of the composition is selected from the group of ammonia and organic amine bases such as monoethanolamine, triethanolamine, isopropanolamine, diethylamine, triisopropanolamine, tetraethanolethylenediamine, and others.

The 1:1 soap compositions are especially adapted for use in aqueous systems to prevent or remove scale build-up. These compositions also have a long term descaling activity especially useful in tub and tile cleaners (industrial and household), water and oil well reclamation, water distribution system reclamation, cooling towers and heat exchangers, evaporative coolers, industrial cooling systems (such as chemical and plastic processing equipment, etc.), swimming pools, fountains, hydraspas, automotive radiators, hot water heating systems, distillation and reverse osmosis water purification systems and boilers. The environmental applications of this invention lead to the conservation of energy and water.

Compositions of this invention are organic in nature and generally are biodegradable, nontoxic and noncorrosive. Other advantages and benefits of this invention will be understood with reference to the following detailed description and examples.

DETAILED DESCRIPTION

As stated above, the soap compositions of the present invention have 1:1 stoichiometric equivalents of an organic carboxylic acid and an amine base. The effectiveness of aqueous solutions of these neutral soaps is believed to be due to their ability to solubilize magnesium and calcium carbonates which are predominant constituents of scale. The intrinsic character of the compositions is believed to contribute to their long term effectiveness in removing scale and preventing scale precipitation. The compositions of this invention are soaps of weak acids and weak bases and are represented in aqueous equilibrium by the following Equation A:

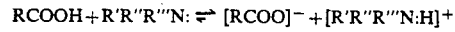

$$RCOOH + R'R''R'''N: \rightleftharpoons [RCOO]^- + [R'R''R'''N:H]^+$$

If excess amine is used in a composition, the equilibrium will be shifted to the right resulting in less "free" acid available in solution and a slower reaction rate with metal carbonates as has been demonstrated by the examples hereinafter. Furthermore, as the acid is consumed when reacting with the metal carbonate, excess amine is formed as the equilibrium shifts to the left. With 1:1 stoichiometric soap compositions, the equilibrium is far to the right but there will be small amounts of "free" acid present in solution to react with magnesium, calcium or other metal carbonates, oxides and hydroxides to form the respective metallic soaps as represented by the following Equation B:

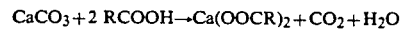

$$CaCO_3 + 2\ RCOOH \rightarrow Ca(OOCR)_2 + CO_2 + H_2O$$

In view of the above reaction, the use level of a 1:1 soaps in a particular application of this invention may require respective organic carboxylic acids that produce calcium, magnesium or other metal soap derivatives that are relatively water soluble and do not precipitate out during use. Generally, magnesium soaps are more soluble than calcium soaps of carboxylic acids and the solubility of both increases substantially with an increase in temperature. For instance, the magnesium salt of hydroxyacetic acid increases in solubility from 7.9 to 29.8 gms per 100 gms water with an increase in temperature from 18° C. to 100° C., whereas the corresponding calcium salt only increases in solubility from 1.2 to 4.6 gms over that same temperature range.

The organic carboxylic acids (as represented by the R group of the above Equation A) suitable for use in compositions of this invention include aromatic, substituted aromatic, aliphatic, and substituted alphatic acids. More preferably the organic acids are hydroxycarboxylic acids including hydroxyacetic, citric, gluconic and tartaric acid. Other organic carboxylic acids include acetic, salicylic and benzoic acids. An amine base of the 1:1 stoichiometric soap composition includes ammonia and organic amines (as represented by the R', R" and R'" group of the above Equation B), preferably alkanolamines including monoethanolamine, triethanolamine, triisopropanolamine and isopropanolamine. Other aliphatic amines such as diethylamine may be employed. The organic carboxylic acids and amine components of the compositions of this invention are very well known with reference to the above identified patents that are listed in the background of this invention. These components have been used to make acidic compositions as stated above with respect to U.S. Pat. No. 4,797,220. Other alkaline compositions have been formulated containing these components. However, before this invention, these carboxylic acids and amine bases were not used as 1:1 stoichiometric soaps for descaling purposes as set forth herein. The descriptions of these patents with respect to the component organic carboxylic acids and amines that may be reacted to form the soaps are incorporated herein by reference.

The following examples further illustrate the practice of this invention and its present best modes.

EXAMPLE 1

Reactivity of Soaps of Carboxylic Acids and Amine Bases with Magnesium Carbonate 0.1 equivalent of carboxylic acid (R-COOH) was reacted in 100 ml of water with 0.1 equivalent of amine base (R'—,R"—,R'"—N:) in a 400 ml beaker with magnetic stirring to yield a clear solution of the 1:1 soap.

1.00 g of magnesium carbonate, n-hydrate (J. T. Baker) powder was added to the aqueous soap solution with magnetic stirring and the beaker covered with aluminum foil. The slurry was then stirred, sometimes heated as noted and observed.

The following results were obtained as reported in Table I.

TABLE I

| ACID | AMINE | OBSERVATIONS |
|---|---|---|
| A. Citric | Triisopropanolamine | 12 min. clear solution |
| B. Citric | Triethanolamine | 45 min. clear solution |
| C. Hydroxyacetic | Triisopropanolamine | 75 min. clear solution |
| D. Hydroxyacetic | Triethanolamine | 75 min. clear solution |
| E. Citric | Ammonia | 95 min. clear solution |
| F. Acetic | Triethanolamine | 120 min. light haze, clears overnight |
| G. Hydroxyacetic | Ammonia | 120 min. low |

TABLE I-continued

| ACID | AMINE | OBSERVATIONS |
|---|---|---|
| | | haze, clears overnight |
| H. Gluconic | Isopropanolamine | 60 min. moderate haze, heat to reflux-light haze |
| I. Salicylic | Triethanolamine | 150 min. moderate haze, heat to reflux-low haze clears overnight |
| J. Tartaric | Triethanolamine | 330 min. clear solution |
| K. Benzoic | Triethanolamine | 330 min. clear solution |
| L. Hydroxyacetic | Diethylamine | 48 hours-low haze, heat to reflux-clears |

Note:
moderate haze = notable change in slurry observed
low haze = stirrer can be seen through slurry
light haze = can see through slurry
clear solution = no slurry, clear and bright As evidenced by Table I, magnesium carbonate reacts with the 1:1 soaps of aliphatic or aromatic carboxylic acids and various amine bases or ammonia. As indicated, the rate of reaction of the 1:1 soaps increases with temperature as expected. Table I demonstrates that 1:1 soaps of this invention react with and dissolve one of the main components of scale very effectively.

EXAMPLE 2

Reactivity of Soaps and Amine Bases with Calcium Carbonate 0.1 equivalent of carboxylic acid (R-COOH) was reacted in 100 ml of water with 0.1 equivalent of amine base (R'—,R"—,R'"—N:) in a 400 ml beaker with magnetic stirring to yield a clear solution of the 1:1 soap.

1.00 g of calcium carbonate (EM Science) powder was added to the aqueous soap solution with magnetic stirring and the beaker covered with aluminum foil. The slurry was then stirred, sometimes heated as noted and observed.

The following results were obtained as reported in Table II.

TABLE II

| ACID | AMINE | OBSERVATIONS |
|---|---|---|
| A. Citric | Triisopropanolamine | 1 hr. clear solution |
| B. Citric | Triethanolamine | 2 hrs. clear solution |
| C. Hydroxyacetic | Triethanolamine | 48 hrs., light, whispy precipitate clears on warming |
| D. Hydroxyacetic | Triethanolamine | 4 hrs. heavy slurry, no apparent change. Heat to reflux-clears |
| E. Acetic | Triethanolamine | Heat to reflux. Clears in 30 min. |
| F. Acetic | Triisopropanolamine | Prolong heating to reflux periodically over 1½ hr. period results in clear solution. |

Table II demonstrates that calcium carbonate reacts slower than magnesium carbonate with the 1:1 soaps. If only a trace of calcium carbonate powder is added to an ammonium hydroxyacetate soap solution, the stirred slurry persists after 6 hours at room temperature but the mixture clears overnight indicating that the reaction is slow at room temperature. The citric acid/triisopropanolamine soap somewhat surprisingly provides fairly prompt reaction at room temperature by comparison. Furthermore, comparing Tables I and II, the citric acid/triisopropanolamine and the citric acid/triethanolamine soaps exhibit better response in comparison to other soaps and, thus, would be preferred in certain applications. For other applications where long term activity is desired, i.e., heat exchangers, the slower reacting soaps may be desired.

EXAMPLE 3

Reactivity of Soaps of Carboxylic Acids and Amine Bases with Excess Calcium Carbonate 0.1 equivalent of carboxylic acid (R-COOH) was reacted in 100 ml of water with 0.1 equivalent of amine base (R'—,R''—,R'''—N:) in a 400 ml beaker with magnetic stirring to yield a clear solution of the 1:1 soap.

5.00 g of calcium carbonate (EM Science) powder was added to the aqueous soap solution with magnetic stirring and the slurry transferred to a jar and sealed. The slurries were then periodically shaken over a period of five days along with a control and maintained at room temperature. The slurries were then vacuum filtered and washed well with water. The filter cakes of unreacted calcium carbonate were air dried in an oven at 180° F. followed by 250° F. to constant weight.

The following results were obtained (corrected for the control) as reported in Table III.

TABLE III

| | ACID | AMINE | GMS CALCIUM CARBONATE |
|---|---|---|---|
| A. | none | none | 4.96 (99.2% recovered) |
| B. | Hydroxyacetic | Triethanolamine | 4.46 (89.2% recovered) |
| C. | Acetic | Triethanolamine | 4.71 (94.2% recovered) |
| D. | Hydroxyacetic | Ammonia | 4.44 (88.8% recovered) |
| E. | Salicylic | Triethanolamine | 4.50 (90.0% recovered) |

Examples 1, 2 and 3 demonstrate that 1:1 soaps react with magnesium and calcium carbonate at room temperature and at elevated temperatures. The rates of reaction appear to vary depending upon the acid and/or the amine portion of the soap. Citric acid and hydroxyacetic acid appear to be the preferred carboxylic acids out of the ones listed. Triethanolamine, triisopropanolamine and ammonia appear to be the preferred amines.

EXAMPLE 4

Comparative Reactivity of Alkali Metal Soaps of Carboxylic Acids with Magnesium Carbonate 0.1 equivalent of hydroxyacetic acid was dissolved in 100 ml of water in a 400 ml beaker and reacted with 0.1 equivalent of 6 N sodium hydroxide solution with magnetic stirring.

1.00 g of magnesium carbonate, n-hydrate (J. T. Baker) powder was added to the aqueous 1:1 soap solution with magnetic stirring and the beaker covered with aluminum foil and the slurry stirred and observed.

After 48 hours there was no change in the heavy slurry observed. The slurry was taken heated to reflux and still no change in the heavy slurry could be observed. There was apparently no reaction between the magnesium carbonate and the sodium hydroxyacetate soap solution. Soaps of alkali metal bases do not react with the alkaline earth carbonates. This is expected as alkali metal bases (hydroxides) are strong bases and react completely with the carboxylic acids, such as in Equation A above, and drive the reaction all the way to the right (soap) leaving no "free" acid available in solution.

EXAMPLE 5

Comparative Reactivity of Hydroxyacetic Acid Soap of Triethanolamine with Magnesium Carbonate in the Presence of Excess Triethanolamine 0.1 equivalents of hydroxyacetic acid were reacted with 0.2 equivalents of triethanolamine in 100 ml of water in a 400 ml beaker with magnetic stirring.

1.00 gms of magnesium carbonate powder was added with magnetic stirring and the slurry observed. After 120 min, the slurry was still of moderate haze. (The slurry in a 1:1 soap solution clears in 75 min. See Example 1-D).

The slurry was then heated to reflux with magnetic stirring and the slurry cleared slowly. The increased level of free triethanolamine in the triethanolamine/hydroxyacetic acid soap solution lowers the "free" hydroxyacetic acid concentration by shifting the equilibrium in the direction of the soap thus reducing the rate of reaction with magnesium carbonate because of the lower concentration of the "free" carboxylic acid.

EXAMPLE 6

Inhibition of Water Scale Formation and Precipitation During Concentration by the 1:1 Soap of Hydroxyacetic Acid and Triethanolamine 5.7 ml of an aqueous solution of the 1:1 soap of hydroxyacetic acid and triethanolamine containing 1.0 gm of the soap was added to 500 ml of tap water and the water concentrated to 100 ml by distillation.

No solids were observed after concentration and the solution was crystal clear. On cooling to room temperature, no change was noted in the solution.

A control, without the 1:1 soap, resulted in substantial deposits on the sides of the distillation vessel and the formation of an insoluble precipitate. The 1:1 soap solution of hydroxyacetic acid and triethanolamine is an effective agent to prevent water scale formation during concentration and would be beneficial in distillation, cooling towers, reverse osmosis water purification systems, and the like.

Neutral ionic and nonionic surfactants could assist in the removal of solids in water scale deposits in certain applications which utilize the 1:1 soap to break-up deposits by reacting with carbonates, oxides and hydroxides present. Furthermore, degreasing solvents, perfumes, odorants or masking agents might be advantageously employed in certain product formulations for particular end uses such as tub and tile cleaners.

EXAMPLE 7

1:1 Soap Evaluation in a Consumer Tub and Tile Product Formulation

A tub and tile formulation was prepared using an aqueous mixture of ammonia and triethanolamine in combination with hydroxyacetic acid in a 1:1 stoichiometric concentration along with other ingredients, i.e., odorizer, degreasing solvent, etc.

The formulation was sprayed on one half of a water spotted shower door and allowed to stand for one hour. The shower door was then rinsed with water and a comparison made between the treated and untreated door areas. The treated area of the door was clean and bright. The untreated area of the door remained spotted as at the beginning of the test. A tub and tile formulation utilizing the 1:1 soap of this invention was an effective agent for the removal of water scale deposits.

Other modifications of the operating examples of this invention will become apparent to a person of ordinary skill in the art to achieve the benefits and advantages afforded by this invention.

What is claimed is:

1. A method for the removal of water scale deposits containing calcium or magnesium carbonate, oxide or hydroxide from a surface comprising
   providing a stoichiometric equivalent of an hydroxycarboxylic acid with a corresponding stoichiometric equivalent of an alkanolamine in the presence of water to yield a 1:1 aqueous neutral soap reaction product,
   wherein an effective amount of free acid is present in solution to react with said calcium or magnesium carbonate, oxide or hydroxide present in water scale to form the respective metallic soap thereof;
   treating a surface having said water scale deposit with an effective amount or said aqueous neutral soap reaction solution for reaction with said calcium or magnesium carbonate, oxide or hydroxide to form said soap; and
   rinsing said treated surface with water to provide said surface with said deposits removed.

2. The method of claim 2 wherein the hydroxycarboxylic acid is selected from the group consisting of hydroxyacetic, citric, benzoic, gluconic, salicylic, tartaric and benzoic, and mixtures thereof.

3. The method of claim 2 wherein the alkanolamine is selected from the group consisting of monoisopropanolamine, diisopropanolamine, triisopropanolamine, monoethanolamine, diethanolamine, triethanolamine, isopropanolamine, and mixtures thereof.

4. A method of removing and preventing in aqueous media scale containing calcium or magnesium carbonate, oxide or hydroxide, comprising
   adding to said aqueous media a neutral soap reaction product of a 1:1 stoichiometric equivalent of an hydroxycarboxylic acid and an alkanolamine,
   wherein an effective amount of free acid is present in solution to react with said calcium or magnesium carbonate, oxide or hydroxide present in said aqueous media to form the respective metallic soap thereof.

5. The method of claim 4 wherein the hydroxycarboxylic acid is selected from the group consisting of hydroxyacetic, citric, benzoic, gluconic, salicylic, tartaric and benzoic, and mixtures thereof.

6. The method of claim 4 wherein the alkanolamine is selected from the group consisting of monoisopropanolamine, diisopropanolamine, triisopropanolamine, monoethanolamine, diethanolamine, triethanolamine, and mixtures thereof.

7. The method of claim 4 comprising treating said deposits by spraying with said aqueous soap product.

8. A method for the removal of water scale deposits containing calcium or magnesium carbonate, oxide or hydroxide from a surface comprising
   providing a stoichiometric equivalent of an organic carboxylic acid selected from the group consisting of hydroxyacetic, citric, acetic, gluconic, salicylic, tartaric and benzoic, and mixtures thereof, with a corresponding stoichiometric equivalent of an amine based selected from the group consisting of ammonia, monoisopropanolamine, diisopropanolamine, triisopropanolamine, monoethanolamine, diethanolamine, triethanolamine, isopropanolamine, diethylmaine and mixtures thereof, in the presence of water to yield a 1:1 aqueous neutral soap reaction product,
   wherein an effective amount of free acid is present in solution to react with said calcium or magnesium carbonate, oxide or hydroxide present in water scale to form the respective metallic soap thereof;
   treating a surface having said water scale deposits with an effective amount or said aqueous neutral soap reaction solution for reaction with said calcium or magnesium carbonate, oxide or hydroxide to form said soap; and
   rinsing said treated surface with water to provide said surface with said deposits removed.

9. A method of removing and preventing in aqueous media scale containing calcium and magnesium carbonate, oxide and hydroxide, comprising:
   adding to said aqueous media a neutral soap reaction product of a 1:1 stoichiometric equivalent of an organic carboxylic acid selected from the group consisting of hydroxyacetic, citric, acetic, gluconic, salicylic, tartaric and benzoic, and mixtures thereof, and an amine base selected from the group consisting of ammonia, monoisopropanolmaine, diisoprpanolamine, triisopropanolmaine, monoethanolamine, diethanolamine, triethanolamine, isopropanolamine, diethylmaine and mixtures thereof,
   wherein an effective amount of free acid is present in solution to react with said calcium or magnesium carbonate, oxide or hydroxide present in water scale to form the respective metallic soap thereof.

* * * * *